(12) United States Patent
Bonesteel et al.

(10) Patent No.: US 7,657,240 B2
(45) Date of Patent: Feb. 2, 2010

(54) ADAPTABLE RF AUDIO RECEIVER AND METHOD FOR ADAPTING PROCESSING OF RF AUDIO SIGNALS

(75) Inventors: Robert Dean Bonesteel, Greentown, IN (US); Todd M. Brandenburg, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 540 days.

(21) Appl. No.: 11/698,344

(22) Filed: Jan. 26, 2007

(65) Prior Publication Data
US 2008/0182534 A1 Jul. 31, 2008

(51) Int. Cl.
*H04B 1/18* (2006.01)
*H04Q 7/20* (2006.01)
(52) U.S. Cl. ............... 455/161.3; 455/226.1; 455/232.1
(58) Field of Classification Search ... 455/161.1–161.3, 455/194.1–194.2, 226.1–226.3, 232.1–234.2
See application file for complete search history.

(56) References Cited

U.S. PATENT DOCUMENTS

2002/0068536 A1* 6/2002 Davis et al. ............... 455/161.1
2003/0039352 A1* 2/2003 Joncour et al. ......... 379/390.01

* cited by examiner

*Primary Examiner*—Lee Nguyen
(74) *Attorney, Agent, or Firm*—Jimmy L. Funke

(57) ABSTRACT

An adjustable RF audio receiver and method are provided. The adjustable RF audio receiver includes an RF antenna configured to receive RF audio signals, and a tuner coupled to the RF antenna and configured to decode received RF audio signals. The adjustable RF audio receiver further includes signal processing circuitry coupled to the tuner and configured to determine signal quality characteristics of the signals received by the adjustable RF audio receiver. The signal processing circuitry provides determined signal quality characteristics and identifies an environment in which the RF audio receiver is operating. The signal processing circuitry is configured to adapt how received signals are processed based on the determined environment.

22 Claims, 3 Drawing Sheets

ADAPTABLE RF AUDIO RECEIVER AND METHOD FOR ADAPTING PROCESSING OF RF AUDIO SIGNALS

TECHNICAL FIELD

The present invention generally relates to RF audio receivers and methods for processing received RF audio signals, and more particularly, to RF audio receivers and methods in which the processing of received RF audio signals is adjusted based on received RF audio signal characteristics.

BACKGROUND OF THE INVENTION

Trucks, boats, automobiles, and other vehicles are commonly equipped with various signal communication devices such as radios for receiving broadcast radio frequency (RF) signals, processing the RF signals, and providing resulting audio programming to passengers.

In typical RF receivers receiving analog RF signals, such as, for example, FM and/or AM radio signals, the RF receiver has an antenna coupled to the receiver for receiving broadcast RF signals and providing them to the receiver. The receiver also typically includes circuitry for receiving the RF signals provided by the antenna, decoding the received signals to extract audio programming, and amplifying the decoded signals to provide audio programming to vehicle occupants. The receiver circuitry typically includes a tuner section and user controls that are configured to allow receiver users to tune in various radio stations located at various frequencies to listen to a variety of audio programming.

In order to improve the quality of the experience provided by a typical vehicle RF audio receiver to a user, vehicle RF audio receivers may include weak-signal processing circuitry to improve how the RF audio receiver processes received signals when the received signals are weak. Presently, weak-signal processing circuitry, if it is included in an RF audio receiver, is typically pre-programmed at the manufacturer, dealership, or auto service location to handle weak RF signals in a predetermined way. For example, at least one current vehicle RF audio receiver may be pre-programmed to operate in one of three modes, depending on the environment in which the user is expected to predominately operate the vehicle. The first of the three modes is typically configured to improve signal processing when the vehicle RF receiver is in a rural environment, and may be referred to as a fringe mode. The second of the three modes is typically configured to improve signal processing when the vehicle RF receiver is in an urban environment, and is sometimes referred to as a low-noise mode. The third of the three modes is typically configured as a default mode to be selected when neither an urban nor a rural pre-programmed mode is appropriate, and may be referred to as a standard mode.

The modes generally adjust the way the vehicle RF receiver processes received signals in order to improve the user listening experience, typically by adjusting blend points where various audio channels are blended together, high-cut points at which higher frequency components of audio signals are attenuated, and the levels of off-station noise at which the receiver mutes off-station signals. These pre-programmed settings may typically only be changed at a dealership by connecting a tool to the vehicle bus and/or RF receiver directly, and reprogramming the vehicle RF receiver to operate in a different mode.

What is needed is an RF audio receiver and method that conveniently allows dynamic switching among various low-noise audio processing modes without requiring a visit to a dealership or manual intervention by service technicians or users to switch among the various modes.

SUMMARY OF THE INVENTION

In accordance with one aspect of the present invention, an adjustable RF audio receiver is provided. The adjustable RF audio receiver includes an RF antenna configured to receive RF audio signals, and a tuner coupled to the RF antenna and configured to tune to received RF audio signals. The adjustable RF audio receiver further includes signal processing circuitry coupled to the tuner and configured to process RF audio signals received by the tuner. The signal processing circuitry is coupled to the tuner and configured to determine at least one signal quality characteristic of the signals received by the adjustable RF audio receiver. The signal processing circuitry identifies an environment in which the RF audio receiver is operating based on the at least one reception quality characteristic. The signal processing circuitry is configured to adapt how received signals are processed based on the identified environment in which the RF audio receiver is operating.

In accordance with another aspect of the present invention, a method for adjusting the processing of audio signals in an RF audio receiver is provided. The method includes the steps of receiving RF audio signals in an RF audio receiver and determining at least one quality characteristic of the received signals. The method further includes the steps of identifying an environment in which the RF audio receiver is operating based on the at least one determined quality characteristics, and adjusting how received signals are processed in the RF audio receiver based on the identified environment in which the RF audio receiver is operating.

According to still another aspect of the present invention, a method for dynamically altering the processing of RF audio signals received in a mobile RF audio receiver is provided. The method includes the steps of periodically scanning multiple frequencies in a mobile RF audio receiver to determine the number of RF signals received by the mobile RF audio receiver, and periodically determining an RF signal strength of RF signals received by the mobile RF audio receiver. The method further includes the step of adjusting how RF audio signals received by the mobile RF audio receiver are processed based on the determined number of received RF signals and the determined signal strength.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
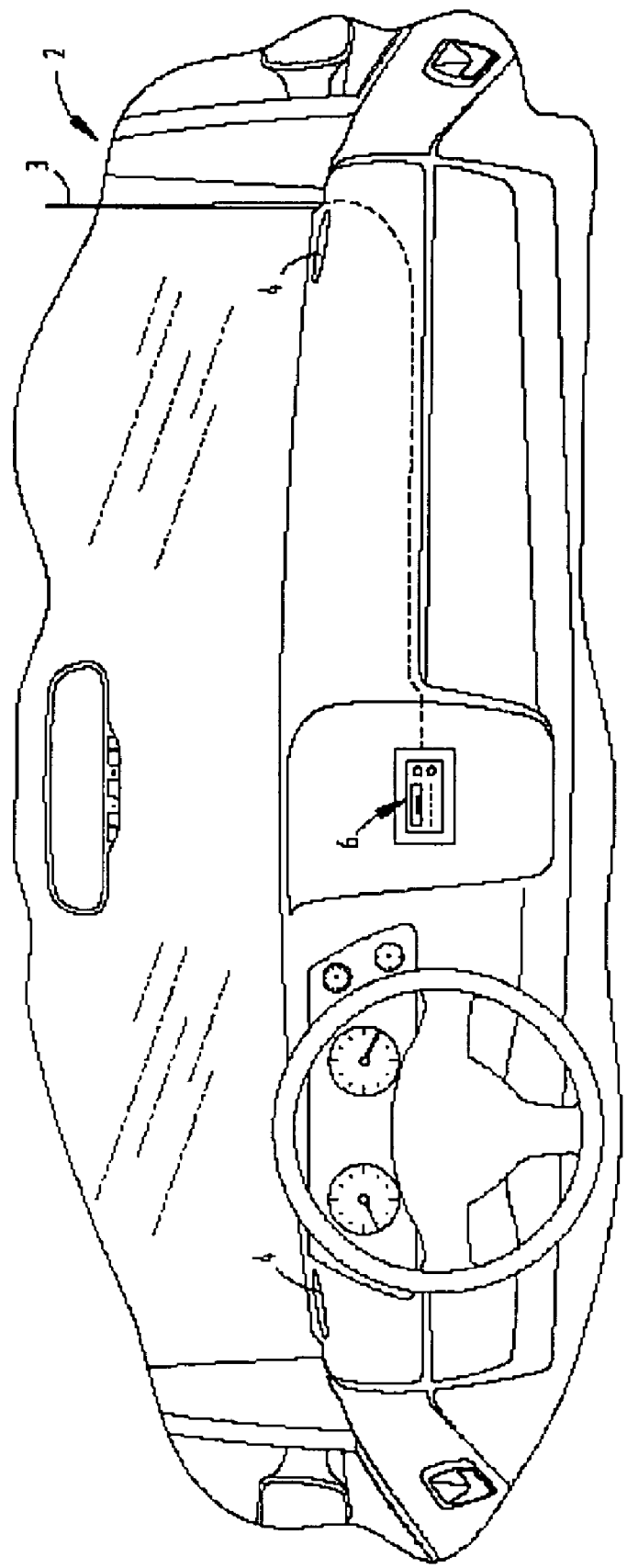
FIG. 1 is a perspective cockpit view generally illustrating an automobile including an RF audio receiver, according to one embodiment of the present invention.

Referring to FIG. 1, a passenger compartment of a vehicle 2 is generally shown equipped with an adjustable RF audio receiver 6 coupled to an antenna 3 and speakers 4. Antenna 3 is configured to receive RF audio signals, and provide the received signals to the adjustable RF audio receiver 6. Adjustable RF audio receiver 6 is configured to process the received RF audio signals from antenna 3 to extract audio programming from the received RF audio signals, amplify the audio programming, and provide the amplified audio programming to speakers 4 so that the audio programming can be broadcast to occupants of the vehicle 2.

Figure 2:
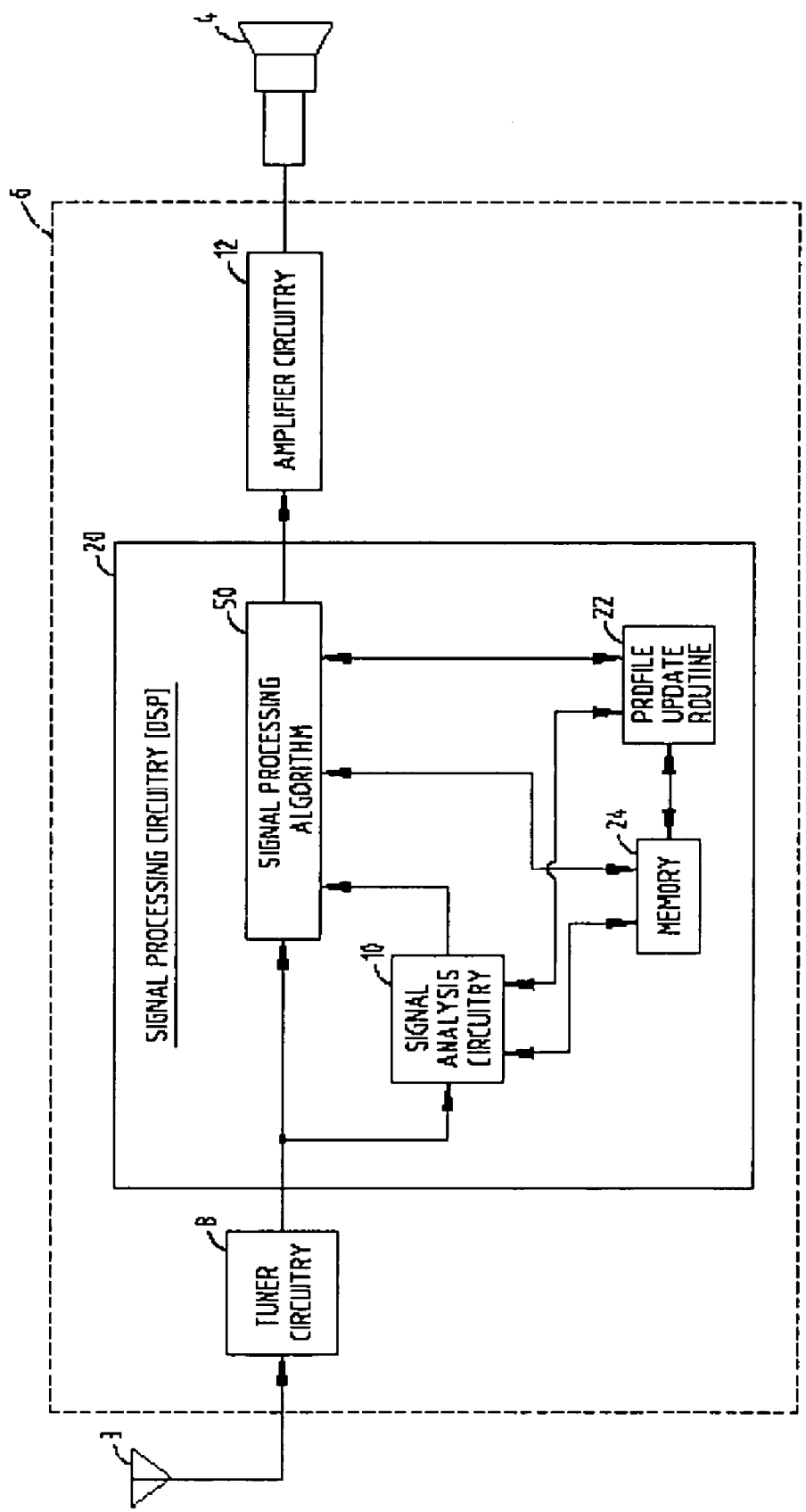
FIG. 2 is a block diagram generally illustrating the RF audio receiver of the embodiment of FIG. 1.

FIG. 2 illustrates additional detail of the adjustable RF audio receiver 6 of FIG. 1. Adjustable RF audio receiver 6 includes tuner circuitry 8 coupled from antenna 3. Tuner circuitry 8 is also shown coupled at its output to signal processing circuitry 20. Tuner circuitry 8 is configured to demodulate RF audio signals received via antenna 3, and to provide the demodulated audio signals to signal processing circuitry 20 for additional processing. According to one embodiment, the signal processing circuitry 20 may include a digital signal processor (DSP) that executes a signal processing algorithm 50. The signal processing circuitry 20 also includes signal analysis circuitry 10. Signal analysis circuitry 10 is configured to evaluate and detect various characteristics of the RF audio signal at the tuned in channel (frequency) received via antenna 3 and demodulated by tuner circuitry 8. The characteristics of the signals evaluated and detected by signal analysis circuitry 10 may include characteristics indicative of the quality of the received RF audio signals, such as, for example, the number of RF frequencies at which RF audio signals are received, the power (amplitude) of received RF audio signals, and other signal characteristics.

In the present embodiment, the signal processing circuitry 20 is configured to scan through various frequencies at which tuner circuitry 8 is receiving RF audio signals to determine the number of RF frequencies at which broadcast RF audio signals are being received by tuner circuitry 8. The scanning essentially looks at alternate frequencies in the radio band and detects signal quality at each alternate frequency, referred to the radio data system (RDS) as an alternate frequency (AF) update.

In the present embodiment, tuner circuitry 8 is configured to receive RF audio signals in both the amplitude modulation (AM) frequency band and frequency modulation (FM) frequency band. Signal processing circuitry 20 is configured to operate in conjunction with tuner circuitry 8 such that the entire AM frequency band may be scanned, and such that the number of RF frequencies at which audio programming is received in the AM frequency band by tuner circuitry 8 is determined. In addition, signal processing circuitry 20 is configured to operate in conjunction with tuner circuitry 8 to scan the FM frequency band to determine the number of RF frequencies at which audio signals are received in the FM frequency band by tuner circuitry 8. Signal processing circuitry 20 is further configured to provide information indicative of the number of RF frequencies at which audio programming is received in both the AM and FM frequency bands by tuner circuitry 8. The number of frequencies at which audio signals are received may be referred to as a "station count." In addition, signal processing circuitry 20 is configured to determine the amplitude at which RF audio signals are received at various frequencies by tuner circuitry 8, and to provide the determined amplitude information to a profile update routine 22.

The signal analysis circuitry 10 may further be configured to determine one or more other signal quality characteristics of RF audio signals at alternate frequencies received and demodulated by tuner circuitry 8, such as, for example, ultrasonic noise levels of received RF audio signals, wide band amplitude modulation characteristics of received RF audio signals, center frequencies of received RF audio signals, and automatic gain control characteristics of received RF audio signals.

In the present embodiment, signal processing circuitry 20 is further configured to determine, based on the number of RF frequencies at which audio signals are received by tuner circuitry 8 (the station count), and based on the amplitude of RF audio signals received by tuner circuitry 8, whether RF audio receiver 6 is located in a rural or an urban environment. Signal processing circuitry 20 is further configured to provide a signal quality metric signal indicative of whether the RF audio receiver 6 is located in a rural environment or an urban environment.

In the present embodiment, signal processing circuitry 20 may determine that RF audio receiver 6 is located in an urban environment if the number of RF frequencies at which audio signals are received by tuner circuitry 8 is high (e.g., five stations greater than 90 dBf), and if the amplitude of RF audio signals received by tuner circuitry 8 is high. If signal processing circuitry 20 determines that the number of RF frequencies at which audio signals are received by tuner circuitry 8 is low (e.g., no more than two stations greater than 40 dBf), and that the amplitude of RF audio signals received by tuner circuitry 8 is also low, the receiver 6 is configured to determine that RF audio receiver 6 is located in a rural environment. Based on these determinations, profile update routine 22 provides a signal quality metric signal that is indicative of whether RF audio receiver 6 is located in an urban or a rural environment.

According to alternate embodiments, receiver 6 may evaluate additional signal characteristics in addition to, or other than, the number of RF frequencies at which audio signals are received by tuner circuitry 8, and the amplitude of RF audio signals received by tuner circuitry 8, to determine whether RF audio receiver 6 is located or operating in an urban or a rural environment. It should also be appreciated that in other alternate embodiments, receiver 6 may be configured to determine and provide indications of locations of adjustable RF audio receiver 6 other than urban or rural environments.

In the present embodiment, signal processing circuitry 20 is coupled to tuner circuitry 8 and amplifier circuitry 12. As shown, signal processing circuitry 20 includes signal analysis circuitry 10 and profile update routine 22 coupled to memory 24. Memory 24 includes a signal processing algorithm 50 configured to alter how RF audio signals received by RF audio receiver 6 are processed in signal processing circuitry 20 based at least in part on information provided by signal analysis circuitry 10 and profile update routine 22.

Figure 3:
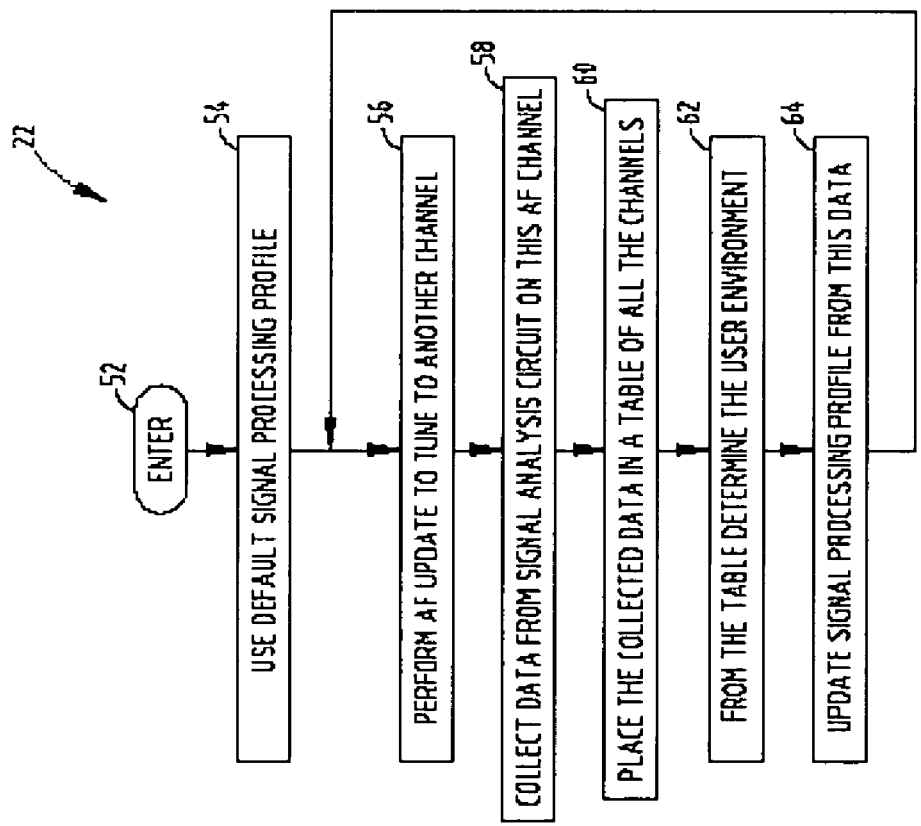
FIG. 3 is a flow diagram generally illustrating profile update logic according to one embodiment of the invention.

Referring to FIG. 3, the signal processing update routine 22 is illustrated according to one embodiment. Routine 22 begins at step 52 and proceeds to use the default signal processing profile stored in memory in step 54. The default profile is a mode that has preconfigured parameter settings, also referred to as the standard mode. Next, the profile update routine 22 performs an alternate frequency (AF) update to tune to another channel (frequency) in step 56. The alternate frequency update essentially includes quickly and periodically switching to alternate frequencies within the radio band. Once switched to the alternate frequency, the signal processing circuitry detects the signal quality of the demodulated audio signal at that alternate frequency and, when complete, either returns to the original frequency or switches to another alternate frequency to repeat the steps of detecting the signal quality at each of a plurality of alternate frequencies. Accordingly, the AF update essentially monitors signal quality of audio signals at each of a plurality of available stations within a radio band. From the detected signal quality, routine 22 may further determine the number of RF frequencies at which suitable audio signals are available.

Once the AF update is complete in step 56, profile update routine 22 collects the data from the signal analysis circuitry on each of the alternate frequency channels in step 58. The collected data is placed into a table of all of the channels in step 60. From the table, profile update routine 22 determines the user environment in step 62. Routine 22 then updates the signal processing profile from the determined user environment data in step 64. Routine 22 then returns to step 56 to perform an AF update on another channel and repeats steps 56-64 to continuously update the profile.

In the present embodiment, signal processing circuitry 20 is configured to adjust receives settings based on the determined user environment which is based on one or more received signal quality characteristics and signal quality metric signals. More specifically, when signal processing circuitry 20 determines that the number of RF frequencies at which audio signals are received by tuner circuitry 8 is high (for example, above 40 dBf), and that the amplitude of RF audio signals received by tuner circuitry 8 is also high (for example, above 40 dBf). Signal processing circuitry 20 also uses this information to determine that RF audio receiver 6 is likely in an urban (also referred to as low noise) environment, and provides a signal quality metric. In this case, signal processing circuitry 20 is configured to adjust blend point processing settings, high-cut point processing settings, off-station noise processing settings, and stop/seek processing settings, such that the signal provided by signal processing circuitry 20 to amplifier circuitry 12 and speakers 4 is optimized. Therefore, when an urban location is indicated based on the information provided, signal processing circuitry 20 processes the signals received from tuner circuitry 8 in an urban or low noise mode.

When signal processing circuitry 20 determines that the number of RF frequencies at which audio signals are received by tuner circuitry 8 is low (for example, below 30 dBf), and that the amplitude of RF audio signals received by tuner circuitry 8 is also low (for example, below 30 dBf), this information is used to determine that RF audio receiver 6 is likely in a rural (also known as fringe) environment. In this case, signal processing circuitry 20 is configured to adjust blend point processing settings, high-cut point processing settings, off-station noise processing settings, and stop/seek processing settings, such that a signal provided by signal processing circuitry 20 to amplifier circuitry 12 and one or more speakers 4 is optimized. Therefore, when signals indicate that RF audio receiver 6 may be operating in a rural or fringe environment, signal processing circuitry 20 is configured to process signals received from tuner circuitry 8 in a rural or fringe mode.

When signal processing circuitry 20 determines that RF audio receiver 6 is operating in neither an urban mode nor a rural mode, signal processing circuitry 20 is configured to adjust blend point processing settings, high-cut point processing settings, off-station noise processing settings, and stop/seek processing settings, such that signals received from tuner circuitry 8 are processed in a standard or default mode that is optimized to environments other than urban or rural environments.

In the present embodiment, blend point, high-cut point, off-station noise, and stop/seek processing settings may differ based on whether signal processing circuitry 20 is operating in an urban mode, a rural mode, or a standard mode. One blend point processing setting that varies, based on the weak signal processing mode in which signal processing circuitry 20 is operating when a weak RF signal level is received, is the point at which a weak RF signal level will cause separate audio channels, such as left and right stereo audio channels, to blend into a single mono signal. This point may be referred to as the blend point. In the present exemplary embodiment, signal processing circuitry 20 is configured to select the blend point, such that signal processing circuitry 20 begins blending separate audio channels into a single audio channel where the received signal has an RF level of approximately 39 dBf when signal processing circuitry 20 is operating in the urban mode, approximately 36 dBf when signal processing circuitry 20 is operating in the standard mode, and approximately 29 dBf when signal processing circuitry 20 is operating in the rural mode.

One high-cut signal processing setting that varies, depending on the weak signal processing mode in which signal processing circuitry 20 is operating, is the RF level of the received signal at which high frequencies, such as, for example, 7.5 kHz frequencies, begin to be attenuated by signal processing circuitry 20. This may also be referred to as a high-cut point. In the present embodiment, signal processing circuitry 20 selects a high-cut point, such that signal processing circuitry 20 begins to attenuate high frequency signals at an input signal level of approximately 30 dBf when signal processing circuitry 20 is operating in the standard mode, approximately 31 dBf when signal processing circuitry 20 is operating in the fringe mode, and approximately 25 dBf when signal processing circuitry 20 is operating in the urban mode.

One off-station noise signal processing setting that varies, depending on the mode in which signal processing circuitry 20 is operating, is the amount by which off-station noise is attenuated at low input signal levels, such as, for example, 0 dBf. In the present embodiment, off-station noise is attenuated most by signal processing circuitry 20 when signal processing circuitry 20 is operating in the urban mode. The off-station noise is attenuated to a lesser extent when signal processing circuitry 20 is operating in a standard mode, and is least attenuated when signal processing circuitry 20 is operating in a rural mode.

One stop/seek signal processing setting that varies, depending on the mode in which signal processing circuitry 20 is operating, is a received signal power level at which the stop/seek function stops during a scan of frequencies in a received frequency band, and provides the received signal to amplifier circuitry 12 for playback through speakers 4. This may also be referred to as a stop/seek point.

In the present embodiment, signal processing circuitry 20 is configured to select a stop/seek point, such that signal processing circuitry 20 allows signals having an RF level of 30 dBf or higher to be provided to amplifier circuitry 12 for playback when signal processing circuitry 20 is operating in the standard mode, allows signals having an RF level of 40 dBf or higher to be played back through amplifier circuitry 12 when signal processing circuitry 20 is operating in the urban mode, and allows signals having an RF level of 20 dBf or higher to be played back through amplifier circuitry 12 when signal processing circuitry 20 is operating in a fringe mode.

It should be appreciated that although the present embodiment incorporates three modes, and identifies certain blend point, high-cut point, off-station noise, and stop/seek processing settings associated with the three modes, in alternate embodiments, settings other than those identified above with respect to the present embodiment for blend point, high-cut point, off-station noise, and stop/seek processing settings may be provided. In addition, it should be appreciated that additional processing settings other than blend point, high-cut point, off-station noise, and stop/seek processing settings may be associated with various processing modes of signal processing circuitry 20, and that signal processing circuitry 20 could further be configured in alternate embodiments to support a wide variety of modes in addition to a standard mode, a rural mode, and an urban mode.

In one embodiment, signal quality information may be provided periodically to signal processing circuitry 20. In this embodiment, signal processing circuitry 20 is configured to periodically adapt blend point processing settings, high-cut point processing settings, off-station noise processing settings, stop/seek processing settings, and other processing settings responsive to signal quality signals independently of each other, or in various combinations. This may occur without the blend point processing settings, high-cut point processing settings, off-station noise processing settings, and stop/seek processing settings together being associated with specific discrete modes of operation of signal processing circuitry 20.

In another embodiment, signal quality information may continuously be provided to signal processing circuitry 20, such that signal processing circuitry 20 continuously adjusts blend point processing settings, high-cut point processing settings, off-station noise settings, stop/seek processing settings, and other processing settings responsive to the signal quality information.

In still another embodiment, a plurality of signal quality factors may be evaluated, including, but not limited to, the number of RF audio signals received by an RF audio receiver, the amplitude of RF audio signals received by an RF audio receiver, an ultrasonic noise level of RF audio signals received by an RF audio receiver, a wide band amplitude modulation characteristic of RF audio signals received by an RF audio receiver, a center frequency of RF audio signals received by an RF audio receiver, an automatic gain control characteristic of RF audio signals received by an RF audio receiver, and other signal characteristics of signals received by an RF audio receiver. These signal quality factors may be combined with the various signal characteristics in a weighted calculation in which each of the characteristics is assigned a specific weight, to come up with an overall single signal characteristic signal quality metric signal. Signal processing circuitry 20 may use a signal quality metric signal to adjust various signal processing parameters used to process audio RF signals received from tuner circuitry 8. These processing parameters include, but are not limited to, blend point parameters, high-cut point parameters, off-station noise parameters, and stop/seek parameters.

It should be appreciated that the functions performed by signal processing circuitry 20 and tuner circuitry 8 may be implemented in a single microcontroller having memory and logic, or in multiple controllers.

Figure 4:
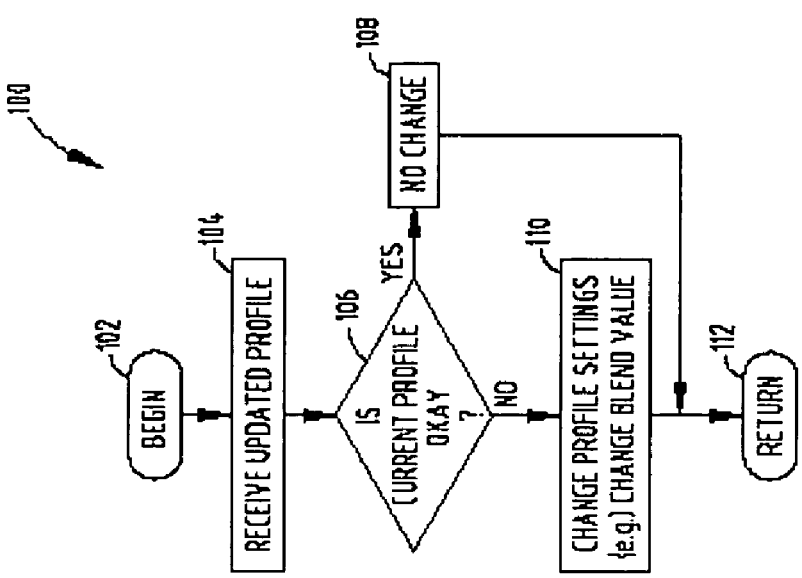
FIG. 4 is a flow diagram generally illustrating a method for adjusting the RF audio receiver based on the updated profile, according to another embodiment of the present invention.

Referring to FIG. 4, a routine 100 for adjusting the signal processing profile in a radio receiver is provided, according to one embodiment. Routine 100 begins at step 102 and proceeds to receive the updated signal processing profile in step 104. Next, routine 100 checks for whether the current profile is okay. The current profile may be okay if the signal processing profile determines the optimal profile is what is currently being used. If the current profile is okay, routine 100 proceeds to make no change to the profile settings in step 108, and then returns at step 112. If the current profile is not okay, routine 100 proceeds to change the profile setting(s) in step 110. For example, the profile setting(s) may be changed by changing the blend value, or other receiver parameter settings. It should be appreciated that any of a number of profile parameter settings may be adjusted based on the signal processor profile generated according to the present invention.

In the present embodiment, the processing of the received signal is altered when the received RF signal is weak. Various parameters involved in the processing of the received signal are altered in this step. These parameters include, but are not limited to, blend point processing characteristics, high-cut point processing characteristics, off-station noise processing characteristics, and scan/seek processing characteristics. In the present embodiment, blend point characteristics, high-cut point processing characteristics, off-station noise processing characteristics, and scan/seek processing characteristics are altered in a specific manner based on whether the determined signal characteristics provided in an earlier step of the method indicate that the RF receiver is located in an urban location, a rural location, or a location other than an urban or rural location. More specifically, if the signal characteristics provided to the signal processing circuitry indicate that the receiver is located in an urban location, the processing of the received signals is altered, such that the signals are processed in an urban mode. If the determined signal characteristics provided to the signal processing circuitry indicate that the receiver is located in a rural environment, the processing of the received signal is altered, such that the signal is processed in a rural mode. If the determined signal characteristics provided to the signal processing circuitry indicate that the receiver is located in other than an urban or a rural location, the processing of the received signal characteristics is altered, such that the received signal is processed in a standard or default mode.

As described above, the RF audio receiver 6 and method 100 of the present invention advantageously provide for the ability to dynamically adjust how received RF audio signals are processed in a receiver based on determined characteristics of the received signals, allowing for an enhanced listening experience for users of a mobile RF audio receiver without requiring that the RF audio receiver be reprogrammed or reconfigured manually based on the expected locale or environment in which the RF receiver will be located and/or operating.

Although the embodiments described above relate to the use of an RF audio receiver located in a vehicle, it should be appreciated that the invention applies equally to RF audio receivers that may be mobile, such as portable RF audio receivers, or that may be located in various environments during their use, such that adjustment of signal processing characteristics, based on the quality and/or characteristics of the received signal, would be advantageous.

It should further be appreciated that the present invention may be applicable to both analog and digital receivers, and may include applications in which programming other than audio programming, such as, for example, video programming and/or data, may be transmitted and/or received.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. An adjustable RF audio receiver, comprising:
an RF antenna configured to receive broadcast RF audio signals;
a tuner coupled to said RF antenna and configured to tune to received RF audio signals; and
signal processing circuitry coupled to said tuner and configured to process broadcast RF audio signals received by said tuner, said signal processing circuitry configured to determine at least one reception quality characteristic of broadcast RF audio signals received by said tuner, said signal processing circuitry further identifying an environment in which the RF audio receiver is operating based on the at least one reception quality characteristic, wherein said signal processing circuitry is configured to adjust how broadcast RF audio signals received by said tuner are processed by said signal processing circuitry based on the identified environment in which the RF audio receiver is operating.

2. The adjustable RF audio receiver of claim 1, wherein the at least one reception quality characteristic determined by said signal processing circuitry comprises at least one of a number of radio frequencies at which RF audio signals are received, an amplitude of received RF audio signals, an ultrasonic noise level of received RF audio signals, wide band amplitude modulation characteristics of received RF audio signals, a center frequency of received RF audio signals, and automatic gain control characteristics of received RF audio signals.

3. The adjustable RF audio receiver of claim 1, wherein said signal processing circuitry is configured to determine a signal quality metric based on a weighted plurality of reception quality characteristics.

4. The adjustable RF audio receiver of claim 3, wherein said signal processing circuitry is configured to adjust how broadcast RF audio signals received by said tuner are processed by said processing circuitry based on the determined signal quality metric.

5. The adjustable RF audio receiver of claim 4, wherein said signal processing circuitry is configured to adjust how broadcast RF audio signals received by said tuner are processed by adjusting at least one of a point at which stereo signals are blended into monaural signals, a magnitude by which high frequency audio signal components are attenuated, a magnitude by which off-station noise is reduced, and a signal level threshold at which a seek function stops at a given frequency when an RF signal is detected.

6. The adjustable RF audio receiver of claim 1, wherein the at least one reception quality characteristic determined by said signal processing circuitry includes at least one of a number of RF frequencies at which audio signals are received by said tuner and an amplitude of RF audio signals received by said tuner, and wherein said signal processing circuitry is further configured to determine, based on the at least one reception quality characteristics, if the RF audio receiver is located in at least one of a rural and urban environment, and is further configured to provide a signal quality metric signal indicative of whether the RF audio receiver is located in at least one of a rural and urban environment.

7. The adjustable RF audio receiver of claim 6, wherein said signal processing circuitry is configured to process RF audio signals received from said tuner in at least a rural mode and an urban mode, and wherein said signal processing circuitry is configured to process RF audio signals received from said tuner in a rural mode when the signal quality metric signal indicates that the RF audio receiver is located in a rural environment, and wherein said signal processing circuitry is configured to process RF audio signals received from said tuner in an urban mode when the signal quality metric signal indicates that the RF audio receiver is located in an urban environment.

8. The adjustable RF audio receiver of claim 7, wherein said signal processing circuitry is configured to provide a signal quality metric signal indicative of an urban location of the RF audio receiver when at least one of the number of RF frequencies at which audio signals are received by said tuner and the amplitude of RF audio signals received by said tuner is high, and wherein said signal processing circuitry is configured to provide a signal quality metric signal indicative of a rural location of the RF audio receiver when at least one of the number of RF frequencies at which audio signals are received by said tuner and the amplitude of RF audio signals received by said tuner is low.

9. The adjustable RF audio receiver of claim 7, wherein said signal processing circuitry is configured to provide a signal quality metric signal indicative of an urban location of the RF audio receiver when both the number of RF frequencies at which audio signals are received by said tuner and the amplitude of RF audio signals received by said tuner are high, and wherein said signal processing circuitry is configured to provide a signal quality metric signal indicative of a rural location of the RF audio receiver when both of the number of RF frequencies at which audio signals are received by said tuner and the amplitude of RF audio signals received by said tuner are low.

10. The adjustable RF audio receiver of claim 7, wherein said signal processing circuitry is configured to at least one of increase an RF signal level of an RF signal received by the adjustable RF audio receiver at which stereo audio channels of the received RF signal are blended together, increase a magnitude by which high frequencies of the received RF signals are attenuated, and increase the magnitude by which off-station noise of received RF signals is attenuated when said signal processing circuitry is operating in an urban mode.

11. The adjustable RF audio receiver of claim 7, wherein said signal processing circuitry is configured to at least one of decrease an RF signal level of an RF signal received by the adjustable RF audio receiver at which stereo audio channels of the received RF signal are blended together, decrease a magnitude by which high frequencies of the received RF signals are attenuated, and decrease the magnitude by which off-station noise of received RF signals is attenuated when said signal processing circuitry is operating in an urban mode.

12. The adjustable RF audio receiver of claim 7, wherein said signal processing circuitry is configured to at least one of increase an RF signal level of an RF signal received by the adjustable RF audio receiver at which stereo audio channels of the received RF signal are blended together, increase a magnitude by which high frequencies of the received RF signals are attenuated, and increase the magnitude by which off-station noise of received RF signals is attenuated when said signal processing circuitry is operating in an urban mode, and wherein said signal processing circuitry is further configured to at least one of decrease an RF signal level of an RF signal received by the adjustable RF audio receiver at which stereo audio channels of the received RF signal are blended together, decrease a magnitude by which high frequencies of the received RF signals are attenuated, and decrease the magnitude by which off-station noise of received RF signals is attenuated when said signal processing circuitry is operating in an urban mode.

13. A method for adjusting the processing of audio signals in an RF audio receiver, comprising the steps of:
- receiving RF audio signals in an RF audio receiver;
- determining in the RF audio receiver at least one quality characteristic of the received signals;
- identifying an environment in which the RF audio receiver is operating based on the at least one determined quality characteristic; and
- adjusting one or more signal processing parameters of the RF audio receiver based on the identified environment in which the RF audio receiver is operating.

14. The method of claim 13, wherein the at least one determined received signal quality characteristic includes at least one of the number of RF audio signals received by the RF audio receiver, the amplitude of RF audio signals received by the RF audio receiver, an ultrasonic noise level of RF audio signals received by the RF audio receiver, a wide band amplitude modulation characteristic of RF audio signals received by the RF audio receiver, a center frequency of RF audio signals received by the RF audio receiver, and an automatic gain control characteristic of RF audio signals received by the RF audio receiver.

15. The method of claim 13, wherein the RF audio receiver signal processing parameters adjusted include at least one of a blend point, a high-cut point, an off-station noise parameter and a seek stop threshold parameter.

16. The method of claim 13, wherein an environment in which the RF audio receiver is operating is identified as at least one of a rural environment and an urban environment.

17. The method of claim 13, wherein the at least one determined quality characteristic of the received signals includes at least one of a number of RF frequencies at which RF audio signals are received by the RF audio receiver and an amplitude of RF audio signals received by the RF audio receiver, further comprising the step of determining in the RF audio receiver, based on the at least one determined quality characteristic of the received signals, if the RF audio receiver is located in one of a rural location and an urban location, and still further comprising the step providing a signal quality metric signal indicative of whether the RF audio receiver is located in at least one of a rural and urban environment to signal processing circuitry of the RF audio receiver.

18. The method of claim 17 further comprising the step of processing the received RF audio signals in the signal processing circuitry in a rural mode when the signal quality metric signal indicates that the RF audio receiver is located in a rural environment, and processing the received RF audio signals in an urban mode when the signal quality metric signal indicates that the RF audio receiver is located in an urban environment.

19. The method of claim 18, wherein the signal quality metric signal is indicative of an urban location of the RF audio receiver when at least one of the number of RF frequencies at which audio signals are received by the RF audio receiver and the amplitude of RF audio signals received by the RF audio receiver is high, and wherein the signal quality metric signal is indicative of a rural location of the RF audio receiver when at least one of the number of RF frequencies at which audio signals are received by the RF audio receiver and the amplitude of RF audio signals received by the RF audio receiver is low.

20. The adjustable RF audio receiver of claim 19, wherein the step of processing the received RF audio signals in a rural mode further includes at least one of increasing an RF signal level of an RF signal received by the RF audio receiver at which stereo audio channels of the received RF signal are blended together, increasing a magnitude by which high frequencies of the received RF signals are attenuated, and increasing the magnitude by which off-station noise of received RF signals is attenuated, and wherein the step of processing the received RF audio signals in an urban mode further includes at least one of decreasing an RF signal level of an RF signal received by the RF audio receiver at which stereo audio channels of the received RF signal are blended together, decreasing a magnitude by which high frequencies of the received RF signals are attenuated, and decreasing the magnitude by which off-station noise of received RF signals is attenuated.

21. A method for dynamically altering the processing of RF audio signals received in a mobile RF audio receiver, comprising the steps of:
- periodically scanning multiple frequencies in a mobile RF audio receiver to determine the number of RF audio signals received by the mobile RF audio receiver;
- periodically determining an RF signal strength of at least one RF audio signal received by the mobile RF audio receiver; and
- adjusting how RF audio signals received by the mobile RF audio receiver are processed in the mobile RF audio receiver based on the determined number of RF audio signals and the determined RF signal strength.

22. The method of claim 21, wherein the step of adjusting how RF audio signals received by the mobile RF audio receiver are processed includes at least one of increasing an RF signal level of an RF signal received by the RF audio receiver at which stereo audio channels of the received RF signal are blended together, increasing a magnitude by which high frequencies of the received RF signals are attenuated, and increasing the magnitude by which off-station noise of received RF signals is attenuated when the determined number of RF audio signals and determined RF signal strength is low, and wherein the step of adjusting how RF audio signals received by the mobile RF audio receiver are processed includes at least one of decreasing an RF signal level of an RF signal received by the RF audio receiver at which stereo audio channels of the received RF signal are blended together, decreasing a magnitude by which high frequencies of the received RF signals are attenuated, and decreasing the magnitude by which off-station noise of received RF signals is attenuated when the determined number of RF audio signals and determined RF signal strength is high.

* * * * *